United States Patent [19]

Shobert et al.

[11] Patent Number: 5,107,167
[45] Date of Patent: Apr. 21, 1992

[54] INCANDESCENT BUG LAMP WITH CADMIUM-FREE POWDER COATING

[75] Inventors: Sarah C. Shobert, Kersey; Ronald G. Blose, Emporium, both of Pa.; Costas C. Lagos, Danvers; Charles Wood, Salem, both of Mass.

[73] Assignee: GTE Products Corporation, Danvers, Mass.

[21] Appl. No.: 665,109

[22] Filed: Mar. 5, 1991

Related U.S. Application Data

[62] Division of Ser. No. 540,543, Jun. 19, 1990, Pat. No. 5,032,420.

[51] Int. Cl.$^5$ .......................... H01K 1/26; H01K 1/32
[52] U.S. Cl. .................................. 313/112; 313/635; 106/451
[58] Field of Search .................. 313/112, 635; 106/451

[56] References Cited

U.S. PATENT DOCUMENTS

| | | | |
|---|---|---|---|
| 2,706,691 | 4/1955 | Schaefer | 313/635 X |
| 2,811,131 | 10/1957 | Lopenski et al. | 118/49.1 |
| 2,877,139 | 3/1959 | Hyde et al. | 313/112 X |
| 2,921,827 | 1/1960 | Meister et al. | 316/12 |
| 3,012,898 | 12/1961 | Seabright | 106/451 |
| 3,847,639 | 11/1974 | Broll et al. | 106/450 X |
| 3,909,649 | 9/1975 | Arsena | 313/112 X |
| 3,928,668 | 12/1975 | Snow | 427/14 |
| 4,081,709 | 3/1978 | Collins et al. | 313/116 |
| 4,099,080 | 4/1978 | Dawson et al. | 313/116 |
| 4,421,803 | 12/1983 | Czeiler et al. | 428/35 |
| 4,441,046 | 4/1984 | James | 313/112 |
| 4,441,047 | 4/1984 | Collins et al. | 313/116 |
| 4,499,397 | 2/1985 | James | 313/112 |
| 4,597,984 | 7/1986 | Jansma | 427/28 |
| 4,633,127 | 12/1986 | Beurskens et al. | 313/635 X |
| 4,806,824 | 2/1989 | Paynter et al. | 313/486 |
| 4,914,346 | 4/1990 | Ingraham | 313/485 |

FOREIGN PATENT DOCUMENTS 1181469  1/1985  Canada .

OTHER PUBLICATIONS

Merck Index, 11th ed., No. 1611, p. 265 (1989).

Primary Examiner—Palmer C. DeMeo
Attorney, Agent, or Firm—Martha Ann Finnegan; Robert E. Walter

[57] ABSTRACT

Disclosed is a yellow incandescent bugfoiler pigment coating comprising a fine-ground blend of praseodymium doped zirconium silicate and silica. This cadmium-free blend is applied electrostatically in three coats to the interior of a bulb to diffuse the light and block the emitted UV wavelengths. The color of the blend will intensify with increasing heat and return to its initial yellow color upon cooling.

2 Claims, No Drawings

INCANDESCENT BUG LAMP WITH CADMIUM-FREE POWDER COATING

This is a divisional of copending application Ser. No. 07/540,543 filed on Jun. 19, 1990, now U.S. Pat. No. 5,032,420.

FIELD OF THE INVENTION

The present invention is directed to incandescent lamps, particularly to lamps commonly referred to as "bug lights" or "bugfoilers." These lamps traditionally contain a coating containing cadmium, which acts to block the UV emitted from the source, thereby reducing the attraction of bugs to the lamp. In the present invention the bugfoiler powder comprises a finely ground compound of praseodymium doped zirconium silicate and silica. This cadmium-free blend is applied electrostatically in a plurality of coats (e.g., three) to the interior of the bulb to diffuse the light and block UV wavelengths. The color of the blend intensifies with increasing heat and then returns to it's initial color upon cooling.

BACKGROUND OF THE INVENTION

The pigments presently used for some yellow colorants and "Bugfoiler" (i.e., bug light) applications contain cadmium in one or more of several forms including: powder, slurry and/or as a ceramic glaze.

For example, in Canadian Patent No. 1,181,469 (General Electric) there is disclosed a bug light coating comprising (a) light refractive particles; (b) a selective light-absorbing particulant colorant; and (c) flux calcined diatomaceous $SiO_2$. The preferred light reflective particles are $Al_2O_3$, $SiO_2$, $Al_2O_3$-$SiO_2$ and/or $CaCO_3$. The preferred colorant is CdS. This composition affords a decorative and functional "yellow" bug light.

While the prior art bug lights are effective, the cadmium employed therein (e.g., CdS, etc.) is considered a carcinogen (see, *Fourth Annual Report on Carcinogens*, NTP 85-002, 1985, p. 48; and *Merck Index*, 11th ed., No. 1611, p. 245 (1989)) and a hazardous waste material. Therefore, continued and/or repeated disposal and usage of cadmium in such applications is costly and no longer acceptable throughout the industry.

SUMMARY OF THE INVENTION

The present invention is directed to an improved, cadmium-free incandescent bugfoiler lamp having coated on its inner surface, a powder consisting of a fine ground compound of praseodymium doped zirconium silicate and silica. This cadmium-free blend is preferably applied electrostatically to the interior of a bulb to diffuse light and block UV wavelengths.

The compositional blend of the present invention has been found to be a cost effective replacement for previously used cadmium containing formulations, first because of the cost of the ingredients used and second due to its simple manufacturing process. In addition, the composition is not carcinogenic and therefore problems such as operator safety and waste disposal are either sharply diminished, or eliminated by the use of this composition in comparison with the prior art compositions containing cadmium.

DETAILED DESCRIPTION OF THE PREFERRED EMBODIMENT

The major pigment constituent of the composition of the present invention is commercially available from O. Hommel Co. (as YE-494 Yellow Pigment) and Ferro Corporation, Color Division (as C-146 Yellow Pigment). These two yellow pigments consist of zirconium oxide doped with praseodymium, having the general chemical formula:

$$ZrSiO_4:Pr$$

For further information on such pigments, see, U.S. Pat. No. 3,847,639, the disclosure of which is hereby incorporated herein by reference, as well as West German Patent No. 1,905,673.

In investigating the potential use of this yellow pigment as a substitute for cadmium-containing materials in bug lights, it was found that the $ZrSiO_4$:Pr pigment would not consistently adhere electrostatically to incandescent lamp walls. Thus, efforts were made to identify a compositional blend which would improve the adherence of the pigment. These efforts included:

(1) Matching particle size to amorphous silica size by dry/wet grinding. Silica particle sizes from about 2 to 10 microns (average particle size) were studied. The wet grinding method generally resulted in a poor coating. Thus, all material were dry-ground to either about 4 micron average particle size or about 2.8 microns. The 4 micron average particle size was deemed preferable because the smaller particle size generally made the pigment whiter than optimally desired.

(2) Amorphous Silica - PPG Lo-Vel 27 was added to the pigment at various levels to improve the adherence characteristics. Blends of pigment with 50, 30, 20, 10, 5 and 2% of silica added to increase adherence and flowability were studied. While all levels of added silica improved pigment adherence, as the percentage of added silica increased, the color of the pigment became whiter, but the overall yellow color did remain. The most preferred level of added amorphous silica was determined to be about 10% (by weight). While amorphous silica was found to be preferred, other forms of silica are believed to be capable of substitution herein for the amorphous silica, e.g., hydrophobic and/or hydrophilic silicas, calcined diatomaceous silicas, and the like, herein collectively referred to as "silica."

(3) Also tested was a combination of the yellow pigment with boric acid (in powder form) to improve adherence. While the boric acid (from about 1 to 5 wt. %) improves adherence, it can decrease the life of the finished lamp if not heated above 800° F.

Finally, it was discovered that in use (i.e., in the illuminated bulb) the pigment changes color (from yellow to orange) with the increasing temperature of the bulb wall, but after use, the pigment returns to its original yellow color once the bulb cools down. This is not believed to be a problem since the consumer purchasing a yellow "bug light" gets a yellow bug light.

As determined from the above discussed tests and research, the currently preferred embodiment for a cadmium-free pigment coating for incandescent bug lamps comprises an electrostatically deposited homogeneous blend of:

a) ZrSiO$_4$:Pr yellow pigment, fine dry-ground to an average particle size of about 4 microns [as determined by light scattering laser diffraction]; and b) 10% amorphous silica, advantageously PPG Lo-Vel 27.

The cadmium-free blend of the present invention is advantageously applied uniformly to the interior surface of the incandescent bulb using an electrostatic deposition process. Such processes are well known in the lamp industry, and are widely varied among the manufacturers of lamps. It is believed that any of the known electrostatic processes may be employed to provide the present coating.

For reference purposes regarding electrostatic deposition of lamp coatings, see inter alia. U.S. Pat. No. 4,914,346 (Ingraham), U.S. Pat. No. 4,806,824 (Paynter, et al.), U.S. Pat. No. 4,597,984 (Jansma), U.S. Pat. No. 4,499,397 (James), U.S. Pat. No. 4,441,047 (Collins, et al.), U.S. Pat. No. 4,441,046 (James), U.S. Pat. No. 4,421,803 (Czeiler, et al.), U.S. Pat. No. 4,099,080 (Dawson, et al.), U.S. Pat. No. 4,081,709 (Collins, et al.), U.S. Pat. No. 3,928,668 (Snow), U.S. Pat. No. 2,921,827 (Meister, et al.), and U.S. Pat. No. 2,811,131 (Lopenski et al.), the disclosures of which are hereby incorporated herein by reference.

The pigment blend of the present invention can be coated in single or multi-layers (i.e., greater than two), in either heavy coats or light coats, as desired by the skilled artisan and the particular requirements of the lamp in which the coating is to be applied. It has been discovered that the preferred bug light coating of the present invention is most advantageously formed as three individually and uniformly applied coats.

The preferred tripartite coating used herein consists of two initial coating layers of the above described cadium-free pigment blend, the first of which is applied at an average weight (average of grams per layer per A-19 bulb) of about 0.1072 ($\pm$0.0399) grams, and the second layer of which is applied at an average weight of about 0.2946 ($\pm$0.0978) grams. The final layer of silica is applied at an average weight of about 0.0478 ($\pm$0.0423) grams, to aid in the adherence of the entire coating to the bulb wall. All three layers preferably used herein average about 0.5012$\pm$0.2038 grams per finished envelope (A-19).

Alternatively, a very thin coating of silica can be applied first to the interior surface of the bulb, with the thin pigment coating applied thereover. Likewise, an initial thin coating of the pigment may be protected with a thin overcoat of silica.

It will also be appreciated that other lamp additives such as, other pigments (e.g., for other colors, etc.), and other additives such as synthetic amorphous silicon dioxide hydrate, titanium dioxide, zinc oxide, aluminum oxide, synthetic amorphous silica, surface treated with hydrocarbon-type wax, fumed and calcined silica, calcined diatomaceous earth and/or silica, and the like, at levels ranging from about 1 wt. percent to about 50 wt. percent may be employed herein for whatever advantages and attributes desired by those of ordinary skill in this art. It likewise will be appreciated however, that such additives may change the flowability, adherence, and the agglomeration properties of the final product, and that modifications in either layering, and/or application procedures may need adjustment to compensate therefor. Likewise, if envelopes other than A-19 are employed, adjustments will be necessary in the amounts of materials required.

The present invention has been described in detail, including the preferred embodiments thereof. However, it will be appreciated that those skilled in the art, upon consideration of the present disclosure, may make modifications and/or improvements on this invention and still be within the scope and spirit of this invention as set forth in the following claims.

What is claimed is:

1. An incandescent bug lamp comprising a sealed glass envelope, a pair of lead-in wires within said envelope, and a resistive filament connected to said lead-in wires, the interior surface of said envelope being coated with at least two individually applied coating layers of a pigment blend, said pigment blend comprising a homogeneous blend of ZrSiO$_4$:Pr and from about 2 to about 50 weight percent silica, said bug lamp further comprising an additional coating layer of silica over the last applied coating to said pigment blend.

2. The bug lamp of claim 1, wherein the silica in the additional coating layer is amorphous.

* * * * *